United States Patent [19]
Lee

[11] Patent Number: 5,667,059
[45] Date of Patent: Sep. 16, 1997

[54] SWITCH MOUNT

[76] Inventor: Chiu-Shan Lee, No. 4, Alley 14, Lane 53, Hung-Tao St., Hsi-Chih Town, Taipei County, Taiwan

[21] Appl. No.: 671,338

[22] Filed: Jun. 27, 1996

[51] Int. Cl.⁶ .................................................. H01H 9/02
[52] U.S. Cl. ............................................. 200/296; 174/53
[58] Field of Search .................................. 200/296, 295; 174/53

[56] References Cited

U.S. PATENT DOCUMENTS

| | | | |
|---|---|---|---|
| 3,964,705 | 6/1976 | Giovanni | 174/53 X |
| 4,857,669 | 8/1989 | Kitumura et al. | 174/53 |
| 5,036,168 | 7/1991 | Kikuchi et al. | 200/295 X |
| 5,452,175 | 9/1995 | Tsai | 200/296 X |

Primary Examiner—Renee S. Luebke
Attorney, Agent, or Firm—Morton J. Rosenberg; David I. Klein

[57] ABSTRACT

A switch mount adapted for the mounting of switches, including a rectangular opening having two long sides and two short sides, a plurality of retainer members and a plurality of spring members alternatively arranged along one long side of the rectangular opening, a plurality of retaining notches and a plurality of retaining flanges alternatively arranged along the opposite long side of the rectangular opening symmetrical to the retainer members and the spring members, each of the retainer members having two lateral clamping walls at two opposite lateral sides, each of the spring members having a head, two shoulders at two opposite lateral sides, and an inwardly downward bottom slope, and a plurality of block respectively disposed in the retaining notch, and two recessed planes at the two opposite short sides, each of the recessed planes having at least one mounting hole for mounting.

2 Claims, 6 Drawing Sheets

5,667,059

SWITCH MOUNT

BACKGROUND OF THE INVENTION

The present invention relates to switch mounts, and relates more particularly to such a switch mount which is suitable for the mounting of any of a variety of switches.

FIG. 6 shows a prior art switch mount (7) adapted for the mounting of switches (2,3). The switch (2) comprises a single switching mechanism, two mounting frames (21) at two opposite ends. Each of the mounting frames (21) has a pair of projecting portions (211). The switch (3) comprises two switching mechanisms, two mounting frames (31) at two opposite sides. Each of the mounting frames (31) has projecting portions (311). The switch mount (7) has a plurality of recessed holes (71) spaced along one long side of the rectangular center opening thereof, and a plurality of spring members (72) spaced along the opposite long side of the rectangular center opening corresponding to the recessed holes (71). During installation, the projecting portions (211, 311) of one mounting frame (21,31) are inserted into the recessed hole(s) (71), and the projecting portions (211,311) of the other mounting frame (21,31) are forced into engagement with the corresponding spring member(s) (72). FIG. 7 shows another structure of switch mount (8) adapted for the mounting of a different structure of switch (4). The switch mount (8) comprises two recessed planes (81) at two opposite ends, and two upright pins (82) respectively raised from the recessed planes (81). The switch (4) comprises a mounting frame (41) around the border. The mounting frame (41) comprises two flat coupling portion (411) at two opposite ends adapted for fitting over the recessed planes (81) of the switch mount (8), two pin holes (413) respectively formed in the flat coupling portion (411) and adapted for coupling to the upright pins (82) of the switch mount (8). The main drawback of the aforesaid switch mounts is that they fit only particular switch(es). Therefore, different switch mounts shall be used for holding different switches.

SUMMARY OF THE INVENTION

The present invention has been accomplished to provide a switch mount which fits any of a variety of switches. According to one aspect of the present invention, the switch mount is adapted for the mounting of switches, comprising a rectangular opening having two long sides and two short sides, a plurality of retainer members and a plurality of spring members alternatively arranged along one long side of the rectangular opening, a plurality of retaining notches and a plurality of retaining flanges alternatively arranged along the opposite long side of the rectangular opening symmetrical to the retainer members and the spring members, each of the retainer members having two lateral clamping walls at two opposite lateral sides, each of the spring members having a head, two shoulders at two opposite lateral sides, and an inwardly downward bottom slope, and a plurality of blocks respectively disposed in the retaining notch, and two recessed planes at the two opposite short sides, each of the recessed planes having at least one mounting hole for mounting. According to another aspect of the present invention, a plurality of receiving holes are formed at one long side of the rectangular opening and adapted for receiving the heads of the spring members.

BRIEF DESCRIPTION OF THE DRAWINGS

FIG. 1A is a perspective view of a second switch structure adapted to be mounted on the switch mount shown in FIG. 1;

FIG. 1B is a perspective view of a third switch structure adapted to be mounted on the switch mount shown in FIG. 1;

DETAILED DESCRIPTION OF THE PREFERRED EMBODIMENT

Figure 1:
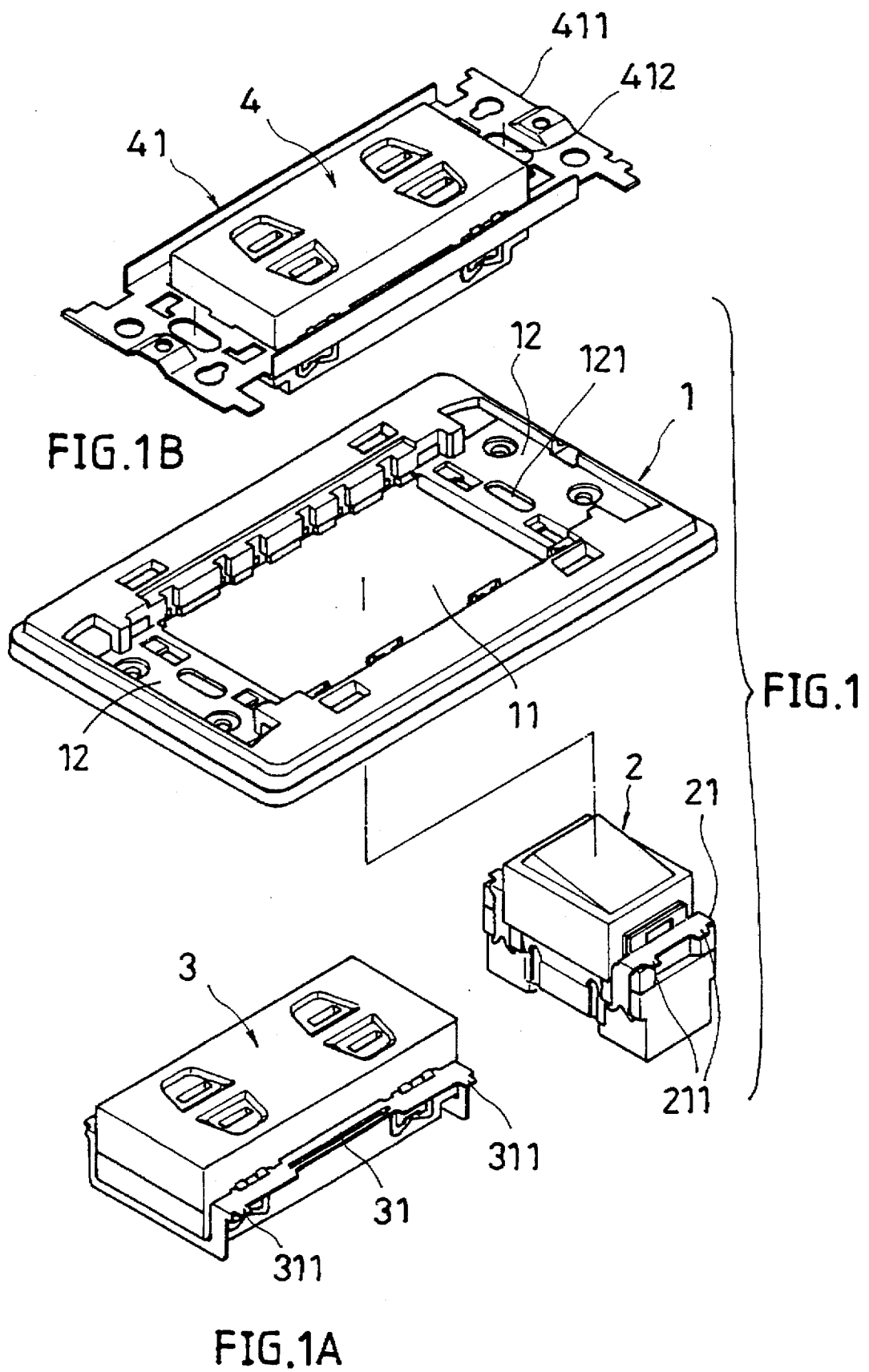
FIG. 1 is an exploded perspective view of a switch mount according to the present invention showing a first switch structure adapted to be mounted in the switch mount.
Figure 2:
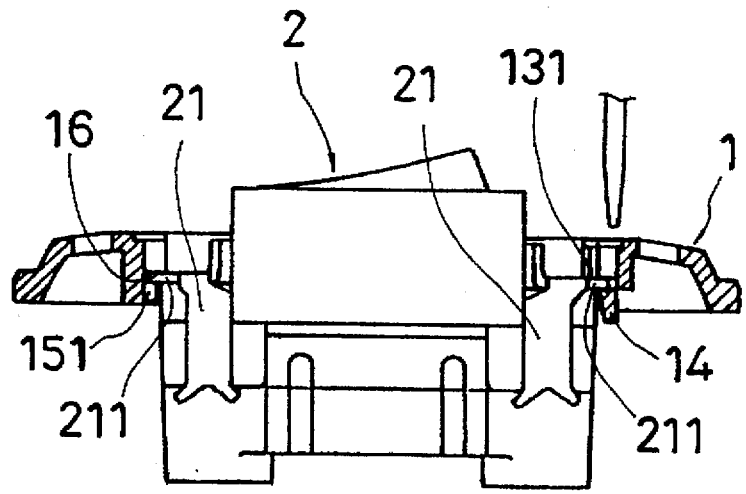
FIG. 2 is a sectional view showing the first switch installed in the switch mount.
Figure 3:
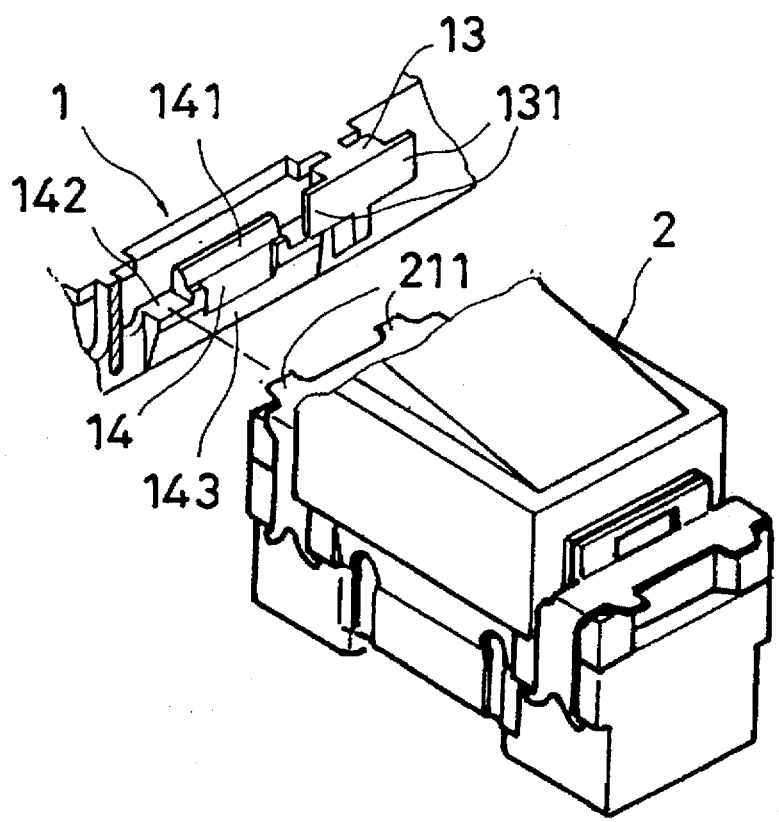
FIG. 3 is a perspective view, partially cut away showing the relationship between the first switch, the spring member and the retainer members according to the present invention.

Referring to FIGS. 1, 2, 3, and 3A, a switch mount 1 is provided having a rectangular opening 11 adapted for the mounting of first switch 2, or second switch 3, or third switch 4. As shown in FIG. 3, the switch mount 1 includes retainer members 13 and a plurality of spring members 14 alternately formed on a wall defined by rectangular opening 11. Each of the retainer members 13 comprises two lateral clamping walls 131 at two opposite lateral sides. Each of the spring members 14 comprises a head 141, two shoulders 142 at two opposite lateral sides, and an inwardly downward bottom slope 143. A plurality of retaining notches 15 and a plurality of retaining flanges 16 are alternatively arranged at the opposite long side of the switch mount 1 within the rectangular opening 11 opposing to the retainer members 13 and the spring members 14. A block 151 is respectively disposed in each retaining notch 15. The switch mount 1 further comprises two recessed planes 12 at two short sides thereof. Each of the recessed planes 12 has a plurality of mounting holes 121.

Figure 3A:
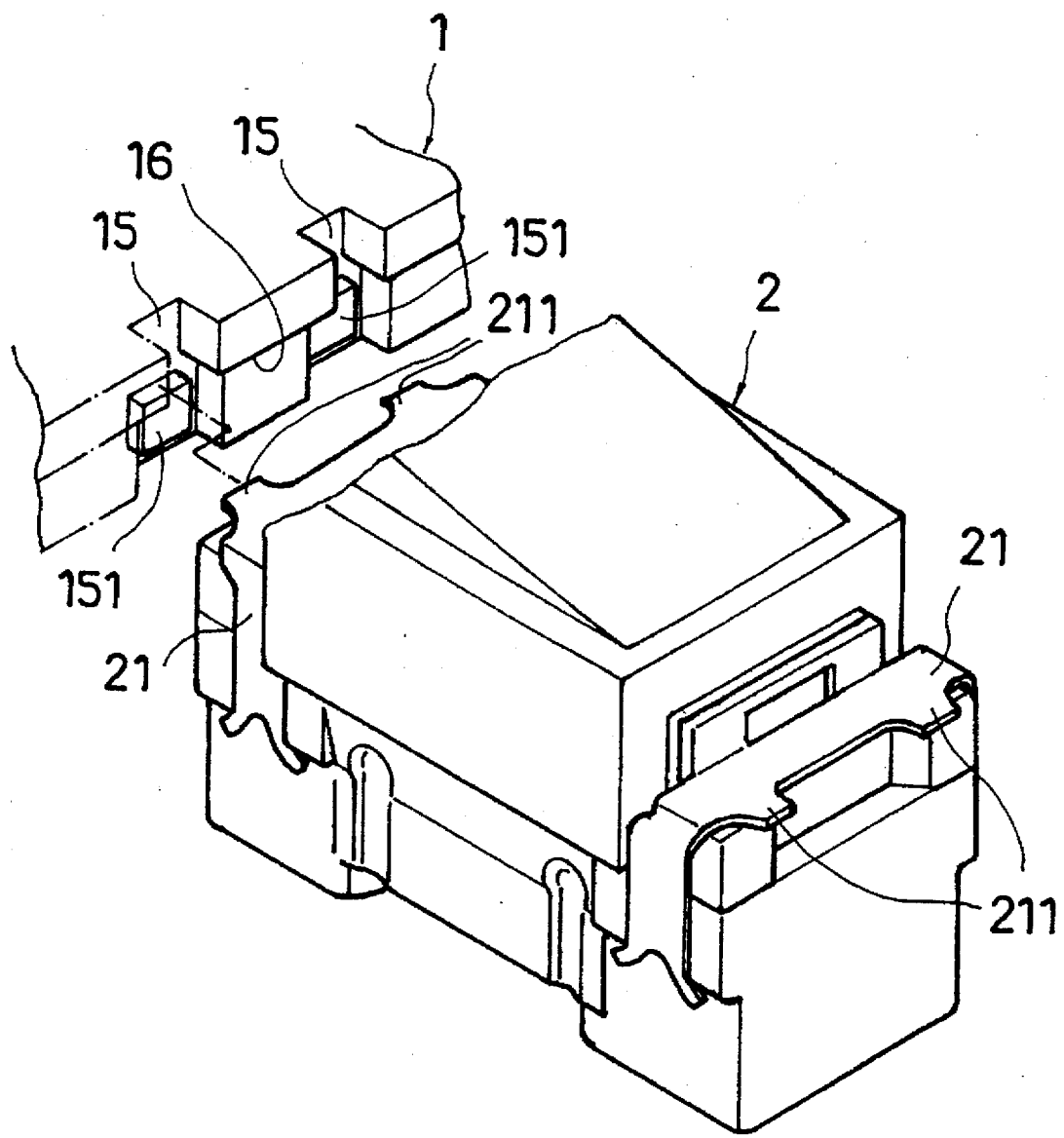
FIG. 3A is a perspective view, partially cut away showing the relationship between the first switch, the retaining notches, the retaining flange, and the blocks according to the present invention.

Referring to FIGS. 3 and 3A, the first switch 2 has two mounting frames 21 at two opposite ends. Each of the mounting frames 21 has a pair of projecting portions 211. In order to install the first switch 2 in the switch mount 1, the two projecting portions 211 of one mounting frame 21 are respectively inserted into two adjacent retaining notches 15 and stopped above the respective blocks 151 in the notches 15, then the two projecting portions 211 of the other mounting frame 21 are moved upwards through the bottom slope 143 of one spring member 14, and forced into engagement with the shoulders 142 and the clamping walls 131 of the adjacent retainer members 13. In order to remove the first switch 2 from the switch mount 1, the head 141 of the respective spring member 141 is pushed backwards from the mounting frame 21 of the first switch 2 to release the respective projecting portions 211 from the constraint of the respective shoulders 142. The second switch 3 is a combination of two first switches 2. Therefore, the installation procedure of the second switch 3 is similar to that of the first switch 2. The third switch 4 has two flat coupling portions 411 extending from two opposite ends of the mounting frame 41 thereof and adapted for fitting over the recessed planes 12 of the switch mount 1. The flat coupling portions 411 have mounting holes 412 adapted for fastening to the mounting holes 121 of the recessed planes 12 of the switch mount 1 by screws.

Figure 4:
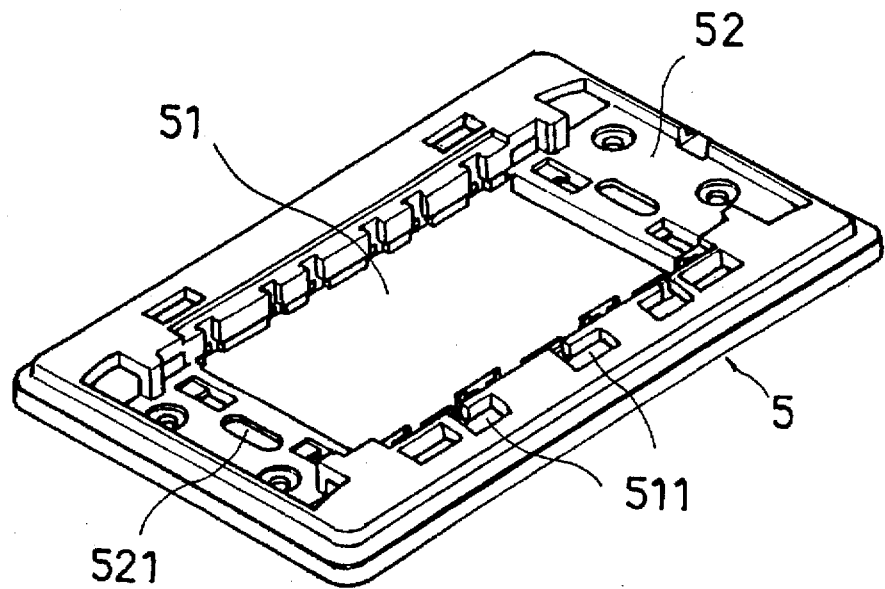
FIG. 4 is a perspective view of an alternate form of the switch mount according to the present invention.
Figure 4A:
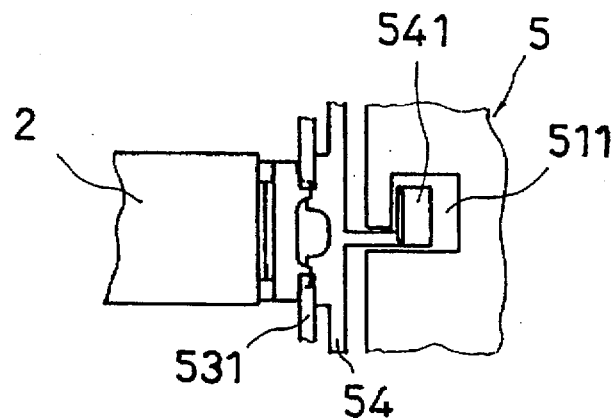
FIG. 4A is a top view of a part of FIG. 4, showing the head of the spring member received in the receiving hole.

FIGS. 4 and 4A show an alternate form of the present invention. According to this alternate form, the switch mount 5 has a plurality of receiving holes 511 adapted for receiving the heads 541 of the spring members 54 thereof respectively.

Figure 5:
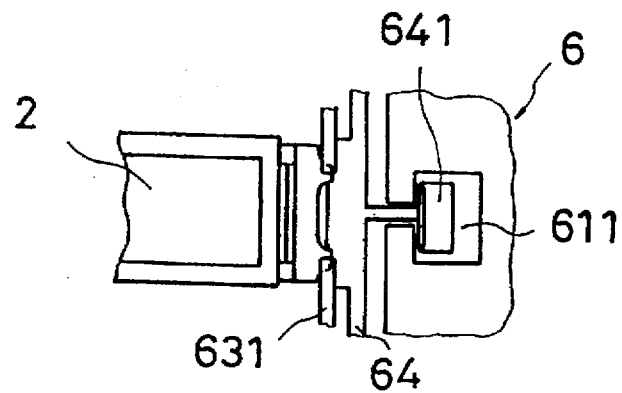
FIG. 5 is a top view of a part of another alternate form of the present invention, showing the head of the spring member received in the receiving hole.
Figure 6:
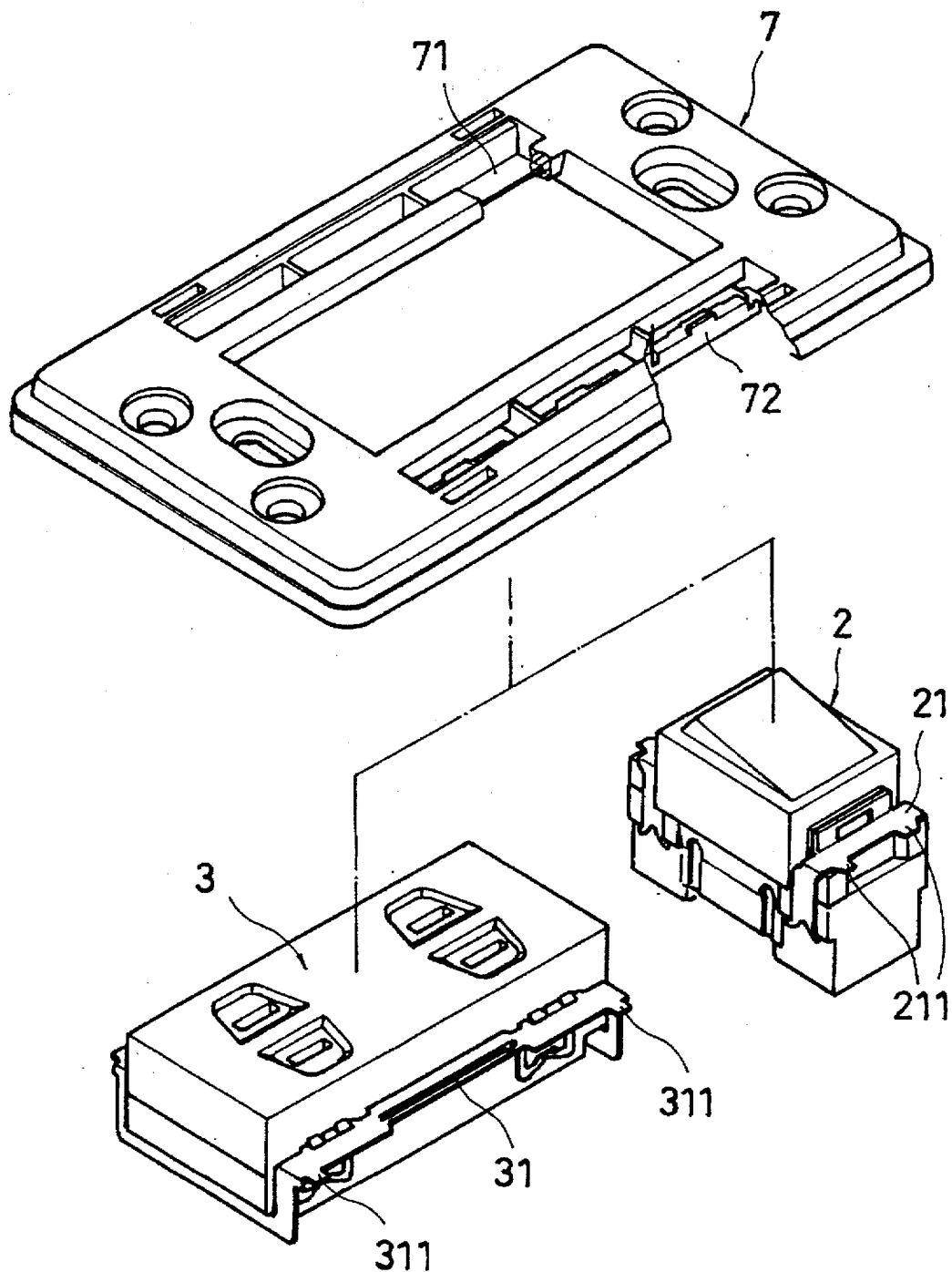
FIG. 6 shows a switch mount according to the prior art.
Figure 7:
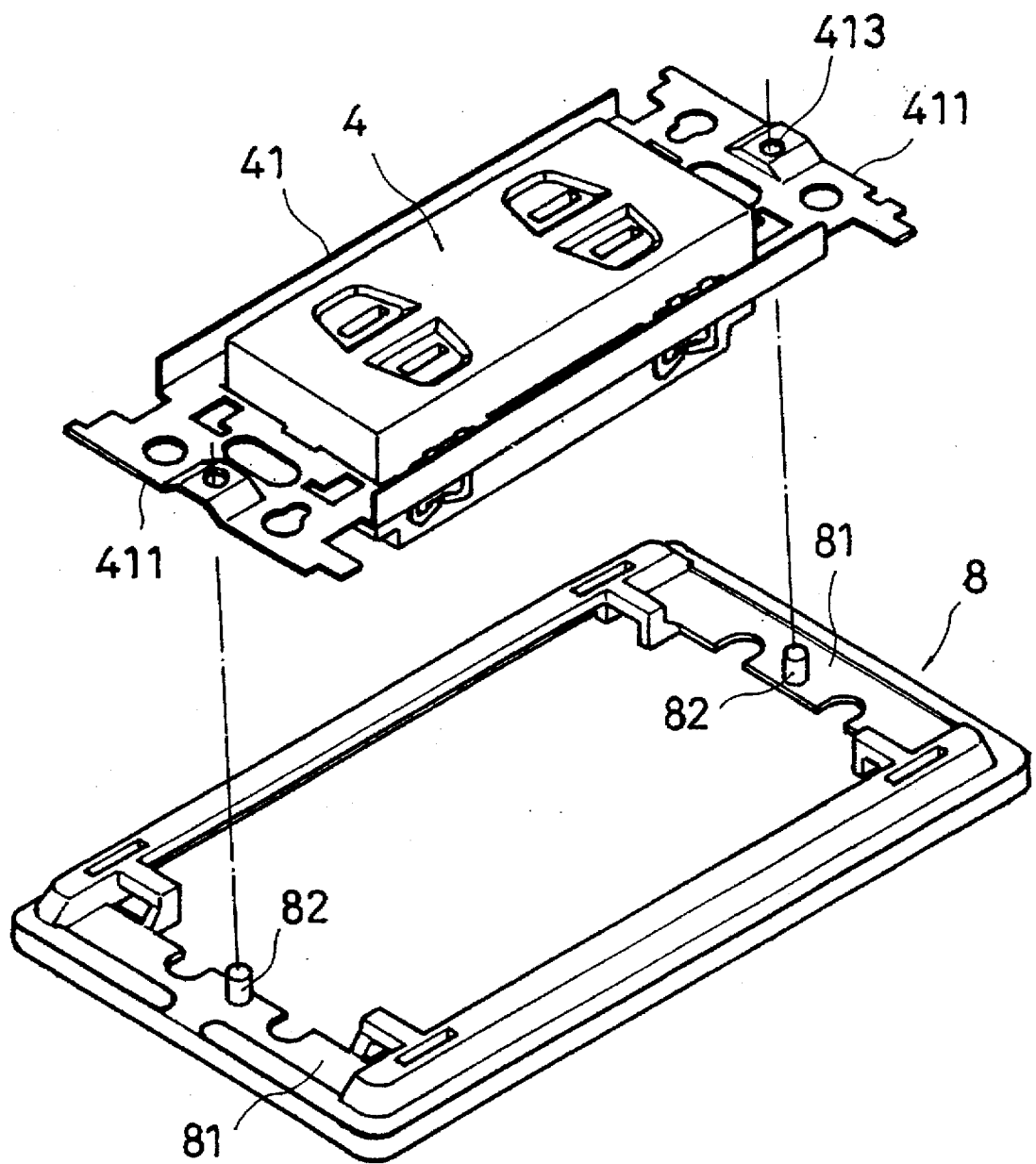
FIG. 7 shows another structure of prior art switch mount.

FIG. 5 shows another alternate form of the present invention. Similar to the alternate form shown in FIGS. 4 and 4A, the switch mount 6 has a plurality of receiving holes 611 adapted for receiving the heads 641 of the spring members 64 thereof respectively. The only difference between the embodiment shown in FIGS. 4 and 4A and the embodiment shown in FIG. 5 is the configuration of the receiving holes 511,611.

It is to be understood that the drawings are designed for purposes of illustration only, and are not intended as a definition of the limits and scope of the invention disclosed.

What the invention claimed is:

1. A switch mount adapted for mounting switches, comprising a rectangular opening having two long sides and two short sides, a plurality of retainer members and a plurality of spring members alternatively arranged along one long side of said rectangular opening, a plurality of retaining notches and a plurality of retaining flanges alternatively arranged along the opposite long side of said rectangular opening symmetrical to said retainer members and said spring members, each of said retainer members comprising two lateral clamping walls at two opposite lateral sides, each of said spring members comprising a head, two shoulders at two opposite lateral sides, and an outwardly downward bottom slope, and a plurality of block respectively disposed in said retaining notches, and two recessed planes at the two opposite short sides, each of said recessed planes having at least one mounting hole for mounting.

2. The switch mount of claim 1 further comprising a plurality of receiving holes disposed at one long side of said rectangular opening and adapted for receiving the heads of said spring members respectively.

\* \* \* \* \*